United States Patent
Clement et al.

(10) Patent No.: US 10,006,310 B2
(45) Date of Patent: Jun. 26, 2018

(54) STEAM POWER PLANT WITH AN ADDITIONAL FLEXIBLE SOLAR SYSTEM FOR THE FLEXIBLE INTEGRATION OF SOLAR ENERGY

(71) Applicant: ALSTOM Technology Ltd, Baden (CH)

(72) Inventors: Olivier Clement, Mannheim (DE); Silvia Velm, Karlsruhe (DE); Volker Schüle, Leimen (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days. days.

(21) Appl. No.: 14/101,698

(22) Filed: Dec. 10, 2013

(65) Prior Publication Data

US 2014/0202156 A1 Jul. 24, 2014

(30) Foreign Application Priority Data

Dec. 13, 2012 (DE) .................. 10 2012 223 122
Mar. 11, 2013 (EP) ..................................... 13158574

(51) Int. Cl.
| | |
|---|---|
| *F01K 25/06* | (2006.01) |
| *F03G 6/06* | (2006.01) |
| *F01K 3/00* | (2006.01) |
| *F22B 1/00* | (2006.01) |
| *F22D 1/00* | (2006.01) |
| *F22D 3/00* | (2006.01) |
| *F01K 13/00* | (2006.01) |

(52) U.S. Cl.
CPC .............. *F01K 3/004* (2013.01); *F01K 13/00* (2013.01); *F03G 6/065* (2013.01); *F22B 1/006* (2013.01); *F22D 1/003* (2013.01); *F22D 3/00* (2013.01); *Y02E 10/46* (2013.01)

(58) Field of Classification Search
CPC .......... F01K 11/02; F01K 13/00; F01K 3/004; F22B 1/006; F22D 1/003; F22D 3/00
USPC ......... 60/649, 670, 641.15, 641.8, 676, 693, 60/645
See application file for complete search history.

(56) References Cited

U.S. PATENT DOCUMENTS

| | | | |
|---|---|---|---|
| 2009/0125152 A1* | 5/2009 | Skowronski | ............ F22D 1/003 700/281 |
| 2011/0198208 A1 | 8/2011 | Olwig et al. | |
| 2012/0117969 A1* | 5/2012 | Neumann et al. | ............... 60/652 |

(Continued)

FOREIGN PATENT DOCUMENTS

| | | | | |
|---|---|---|---|---|
| DE | 102010009485 A1 | 9/2011 | | |
| DE | 102011005142 A1 * | 9/2012 | .............. F22B 1/006 |

(Continued)

OTHER PUBLICATIONS

DE 102011005142 A1 Translation, Haje, Sep. 6, 2012.*

(Continued)

*Primary Examiner* — Laert Dounis
*Assistant Examiner* — Kelsey Stanek
(74) *Attorney, Agent, or Firm* — GE Global Patent Operation; Cynthia W. Flanigan

(57) ABSTRACT

A thermal power plant is described comprising a solar collector field and a heat storage to allow the use of the thermal energy collected by the solar field with a time delay for the production of electricity in the steam power plant.

19 Claims, 9 Drawing Sheets

(56) References Cited

U.S. PATENT DOCUMENTS

| | | | | |
|---|---|---|---|---|
| 2012/0151917 A1* | 6/2012 | Ungerer | ........... | F01K 3/18 60/641.15 |
| 2012/0216540 A1* | 8/2012 | Stoever et al. | ........... | 60/653 |
| 2013/0086904 A1* | 4/2013 | Bent et al. | ........... | 60/641.8 |

FOREIGN PATENT DOCUMENTS

| | | | | |
|---|---|---|---|---|
| EP | 2322768 A1 * | 5/2011 | ........... | F01K 7/34 |
| SU | 836374 A1 | 6/1981 | | |
| WO | 96/031697 | 10/1996 | | |
| WO | 2009/062103 | 5/2009 | | |
| WO | 2010/118796 | 10/2010 | | |
| WO | WO 2010149614 A2 * | 12/2010 | ........... | F01D 19/00 |
| WO | 2011020776 A2 | 2/2011 | | |
| WO | 2011/057881 | 5/2011 | | |
| WO | 2012050788 A2 | 4/2012 | | |
| WO | 2012140007 A2 | 10/2012 | | |

OTHER PUBLICATIONS

EP 2322768 A1 Translation, Fichtner, May 18, 2011.*
Simulating the Integrated Solar Combined Cycle for Power Plants Application in Libya by Gamal M. Elsaket, Sep. 2007.*
European Search Report and Opinion issued in connection with corresponding EP Application No. 13158574.7 dated Feb. 16, 2015.

* cited by examiner

STEAM POWER PLANT WITH AN ADDITIONAL FLEXIBLE SOLAR SYSTEM FOR THE FLEXIBLE INTEGRATION OF SOLAR ENERGY

CROSS-REFERENCE TO RELATED APPLICATIONS

The present application claims priority to European Patent Application No. EP13158574.7 filed Mar. 11, 2013, which further claims priority to German Patent Application No. DE 10 2012 223 122.6 filed Dec. 13, 2012, the entire contents of both are hereby incorporated by reference.

BACKGROUND

Conventional steam power plant plants have a closed water-steam cycle. In the steam generator so much energy is added to the feed water by combustion of a fossil fuel that it passes into the vaporous aggregate condition. This steam drives a generator via one or several steam turbines and afterwards is liquefied again in a condenser.

SUMMARY

The invention is based on the general approach of solar-fossil hybrid power plants. The solar system is combined with heat storage. The claimed invention comprises field of solar collectors to collect thermal energy and a heat storage. This combination is called in conjunction with the claimed invention "flexible solar system".

Existing hybrid pants or published concepts use solar collector power modules to convert solar radiation into thermal energy (solar collectors) or to convert it directly into electrical energy (photovoltaic power plants) or to support a fossil fired power plant.

The hybridization of solar-thermal energy and a fossil-fired steam power plant combines the advantages of both technologies: the current technical and economic advantages of the conventional power plant and the environmental advantages of renewable energy. Furthermore the specific investment costs of the solar system will be lower than for a stand-alone power plant because the required water steam-cycle and infrastructures are already available.

But without energy storage this solar energy can only be used when the solar radiation is available. At this time this additional energy integrated in the power plant will have to compete with comparable energy sources: solar-thermal power plants and photovoltaic power plants.

Currently the photovoltaic panels have a really low specific costs (in €/kW$_{peak}$), which makes the integration of other solar technologies difficult. However the electrical energy, produced by the photovoltaic panels, is currently difficult to store in large scale and is expensive. Consequently, to avoid this competition and to create a competitive advantage, the claimed addition of a heat storage to the solar-thermal/fossil fuel hybridization will allow the plant operator to use the energy collected by the solar collectors at other time of the day (e.g. at night or during cloudy times), when the photovoltaic panels are not in operation.

Consequently the claimed invention combines a solar field with a heat storage. The result are lower specific investment costs compared to stand-alone solar-thermal power plants and the possibility to use the solar energy at the needed time, which delivers a significant advantage against the photovoltaic panels.

DETAILED DESCRIPTION

Figure 1:
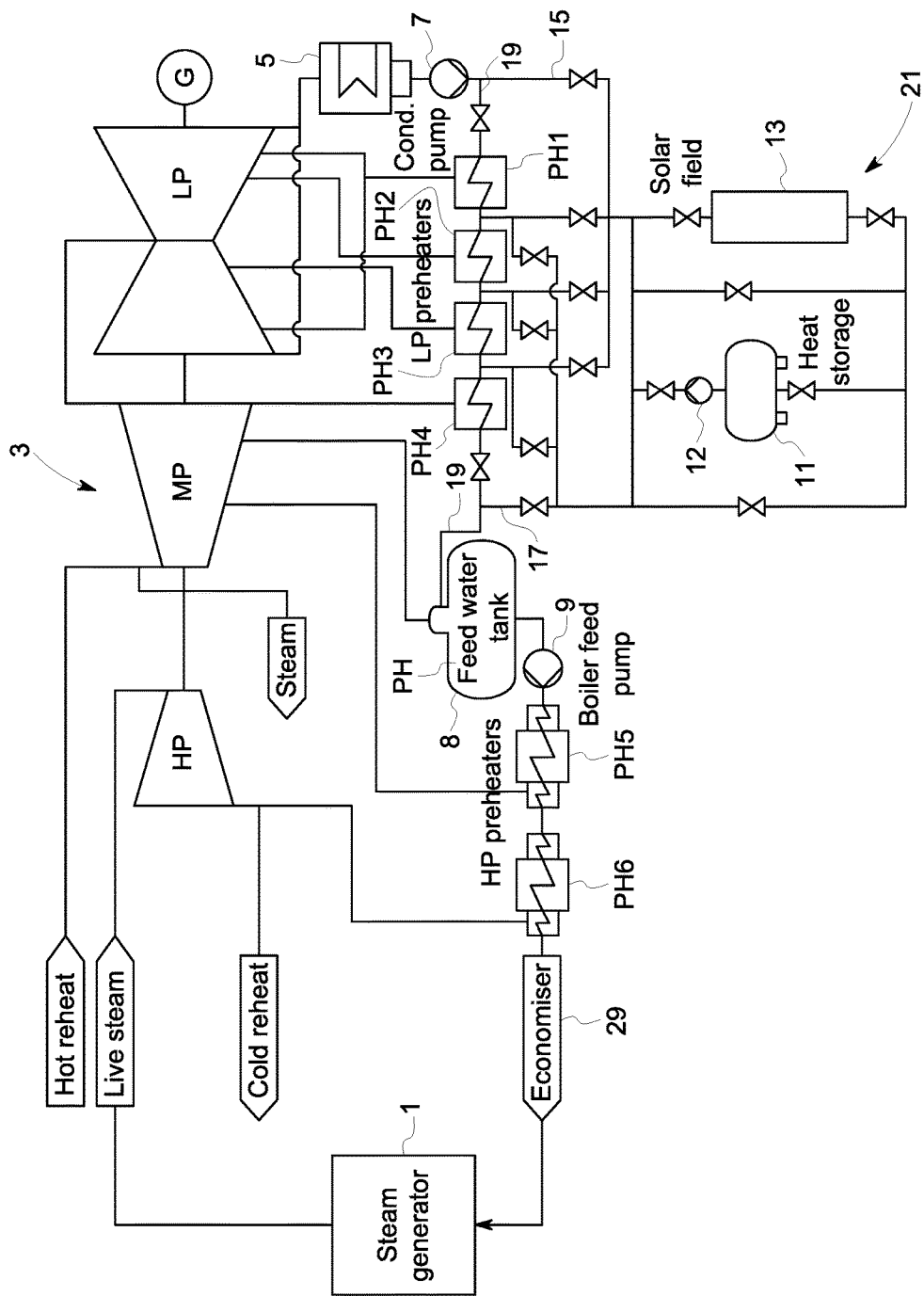
FIG. 1 is a first embodiment of the claimed invention (LP direct integration)

The invention is related to the modification of an existing fossil fired power plant to integrate solar thermal energy either at the same time it is collected or with a certain delay of up to several hours. For economic reasons a delay of 12 hours or less is sufficient.

This can be achieved at the low pressure preheating train or at the high pressure preheating train. In both approaches the additional system combines a solar field and a thermal storage system. Additionally the existing facilities of the conventional steam water power plant are reused as much as possible.

The required collector field and the heat storage system will be arranged within the existing power plant infrastructure and the surroundings areas.

The purpose for introducing solar thermal energy into a fossil fired power plant is to increase the share of renewable energy and use the existing water steam cycle including the turbo group (turbine and generator), which will bring the cost of electricity down compared to stand alone CSP power plants.

The addition of a heat storage to this solar thermal energy integration adds the possibility to use the solar energy at times with high electricity demand and when other comparable renewable energies are not available (e.g. at night or times with no wind). Further the storage system can also be loaded at times with a low load by the condensate or feed water system with energy generated from fossil fuel.

Due to the claimed addition of a heat storage this system will not compete directly with the photovoltaic collectors and offer the advantage that electricity can be produced from solar radiation at the time it is needed.

The additional heat input can be either used for power output increase or for maintaining the poser output while fossil fuel is being saved.

The claimed invention brings benefits in many ways:

The utilization of existing infrastructures eliminates a cost intensive share compared to stand alone power plants.

Furthermore the available grid connection and the existing authorization for the power plant help for the authorization process and eliminate the dedicated costs.

The chosen integration locations (low pressure and/or high pressure) are adapted to the existing solar technologies. Whereas the non-concentrating solar collector technologies are working at the condensate temperature range, the concentrated solar technologies reach temperature parameters comparable to the temperatures of the feed water in the existing steam power plants.

The possibility to store the solar energy and to use it at times when the solar radiation is not available makes the electricity generated economically more valuable and is a clear advantage compared to photovoltaic panels, which does not have currently comparable storage installations. Additionally it avoids the direct competition with these technologies when the sun is shining.

Further advantages and advantageous embodiments of the invention can be taken from the following drawing, its specification and the patent claims. All features described in the drawing, its specification and the patent claims can be relevant for the invention either taken by themselves or in optional combination with each other.

DESCRIPTION OF THE EMBODIMENTS

Figure 2:
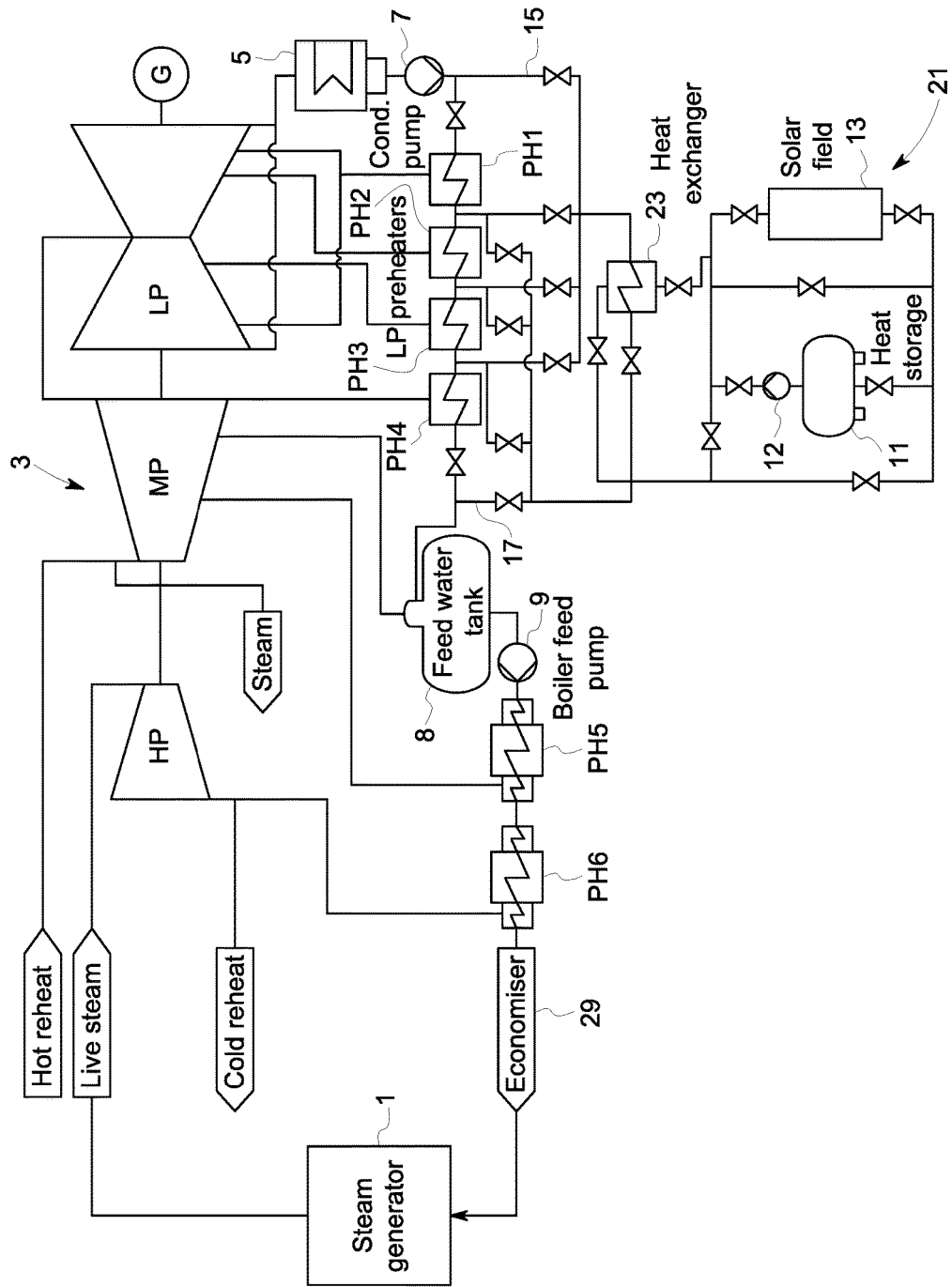
FIG. 2 is a second embodiment of the claimed invention (LP indirect integration with direct heat storage integration)

In FIG. 2 a first embodiment of a steam power plant according to the invention is shown.

As the claimed invention essentially is concerned with the section of the steam power plant between the condenser 5 and the steam generator 1 or an economiser 29 only this part of the steam power plant is shown in FIGS. 2-8. Neither are, for reasons of clarity, all fittings, tubes, valves, pumps and components in FIGS. 2-8 are shown or designated with reference numerals.

The illustration of the valves, tubes, fittings and components corresponds to DIN 2482 "Graphic symbols for heat diagrams", which herewith is referred to, and are thus self-explanatory.

Since all figures are simplified illustrations of the system it may happen that not all components are shown, but in this case a man skilled in the art may easily add the missing component, e. g. a missing pump or the like, to the figures.

Where obviously identical connections are present several times, partially the insertion of reference numerals is dispensed with in order to maintain the clarity of the figures.

In addition to the water-steam circuit of a conventional water steam power plant a heat storage 11 and a solar field 13 (i. e. a field of several solar collectors) are installed. This combination of a heat storage 11 and a solar field 13 is called in conjunction with the claimed invention a flexible solar system 21, because it supports the preheating system with thermal energy from the solar field 13 directly or from the heat storage 11.

At the outlet of the heat storage a pump 12 is installed for loading and unloading the heat storage 11.

The bypassed feedwater mass flow through the flexible solar system 21 changes based on the energy, which can be collected by the solar field 13 and the energy demand of the preheaters PH1 to PH6. A positive difference between the output of the solar field 13 and the energy demand of the preheaters PH1 to PH6 can be stored in the heat storage 8. A negative difference between the output of the solar field 13 and the energy demand of the preheaters PH1 to PH6 is available by unloading the heat storage 8.

Since the temperature of the thermal energy that is delivered by the heat storage 8 is not necessarily a constant value, the thermal energy extracted from the heat storage 8 may be fed into the condensation line 19 at different locations with different operating temperatures. This makes the claimed flexible solar system more efficient independent from the actual operating temperature of the heat storage and the load of the turbine 3.

FIG. 1: Option a) Low Pressure Direct Integration

One of the claimed options is to integrate the thermal energy coming from the solar field 13 at the low pressure pre-heating train, namely the preheaters PH1 to PH4.

The goal is to replace the extracted steam energy used in the pre-heating train from the turbine 3 by the solar energy that is collected by the solar field 13. The low pressure preheating train PH1 to PH4 is bypassed completely or partly by the additional system as displayed in FIG. 1:

A bypass inlet 15 is downstream the condensate pump 7 or at a higher temperature level downstream an existing low pressure pre-heater PH1, PH2 or PH3 and a bypass outlet 17 is upstream the feed water pump 9 or at a lower temperature level downstream an existing low pressure preheater. The ductwork between the bypass inlet 15 and the bypass outlet 17 including valves that is necessary to connect the heat flexible solar system 21 (heat storage 11 and the solar field 13) with the condensate line 19 of the power plant does not bear reference numerals for reasons of clarity.

The condensate parameters at the bypass outlet 17 have to reach the existing parameters. This means that the solar field 13 comprises in most cases non-concentrating solar collectors.

The bypassed condensate mass flow changes based on the energy, which can be and/or are wanted to be integrated.

The operation of the system depends on external parameters:

When the solar radiations are enough to reach the final condensate parameters and this additional energy amount is needed in the existing water steam cycle, then the condensate is partly or completely bypassed to the solar system 13, is heated up in the solar system 13 and goes back to the existing water steam cycle via the bypass outlet 17.

When the solar radiations are enough to reach the final condensate parameters and this additional energy amount is at present not needed in the existing water steam cycle, the solar system 13 can work in parallel to the existing water steam cycle. In this case the energy collected by the solar field 13 is stored in the heat storage 11.

When the solar radiations are not enough to reach the final condensate parameters and this additional energy amount is needed in the existing water steam cycle, the stored energy in the heat storage 11 can be used. A part of the condensate mass flow is in that case bypassed and is routed to the heat storage 8. The cold condensate replaces the stored hot condensate in the heat storage 11. The hot condensate is routed to the existing water steam cycle. For this option the hot condensate is routed upstream the feed water pump 9 into the condensate line 19 via the bypass outlet 17.

If the available solar energy is higher than the possible (or wanted) energy integration, then a part of the solar heated condensate goes back to the existing water steam cycle via the bypass outlet 17 and the part of the solar heated condensate is routed to the heat storage 11. The replaced cold condensate inside the heat storage 11 is then routed to the solar field 13 in order to be heated up again.

If the available solar energy is lower than the possible (or wanted) energy integration, then a part of the condensate is heated in the solar field 13 and the other part is replaced by energy from the heat storage 11.

Following the explanations given about the function of the claimed invention a man skilled in the art will know which valve has to be opened or closed, which pump 12, 14 has to be activated or shut down, since the figures are at least to that extent self-explanatory.

The option a) as illustrated in FIG. 1 uses the same heat carrying medium, i. e. the steam or water of the steam water circuit of the power plant (direct integration). This reduces the heat losses and the investment costs.

These basic principles explained in conjunction with FIG. 1 are applicable to the other embodiments of the claimed invention as illustrated and described in conjunction with FIGS. 2 to 8.

FIG. 2 Option b) Low Pressure Indirect Integration

The second embodiment comprises several concepts with the same place of the bypass inlet 15 and the bypass outlet 17 than as FIG. 1 (option a)). They are displayed
 in FIG. 2 for option b).1,
 in FIG. 3 for option b).2 and
 in FIG. 4 for option b).3.

Figure 3:
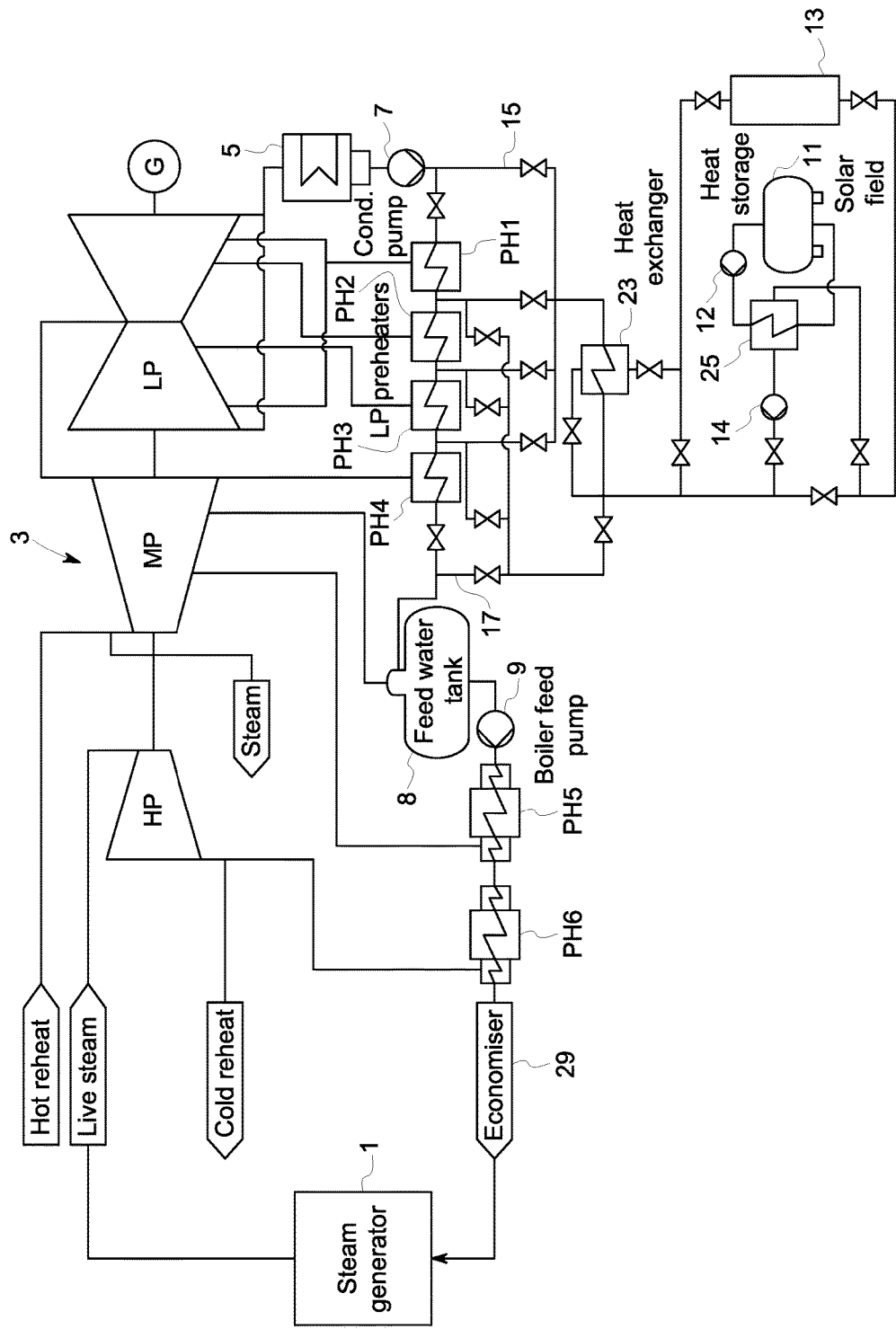
FIG. 3 is a third embodiment of the claimed invention (LP indirect integration with indirect heat storage integration)
Figure 4:
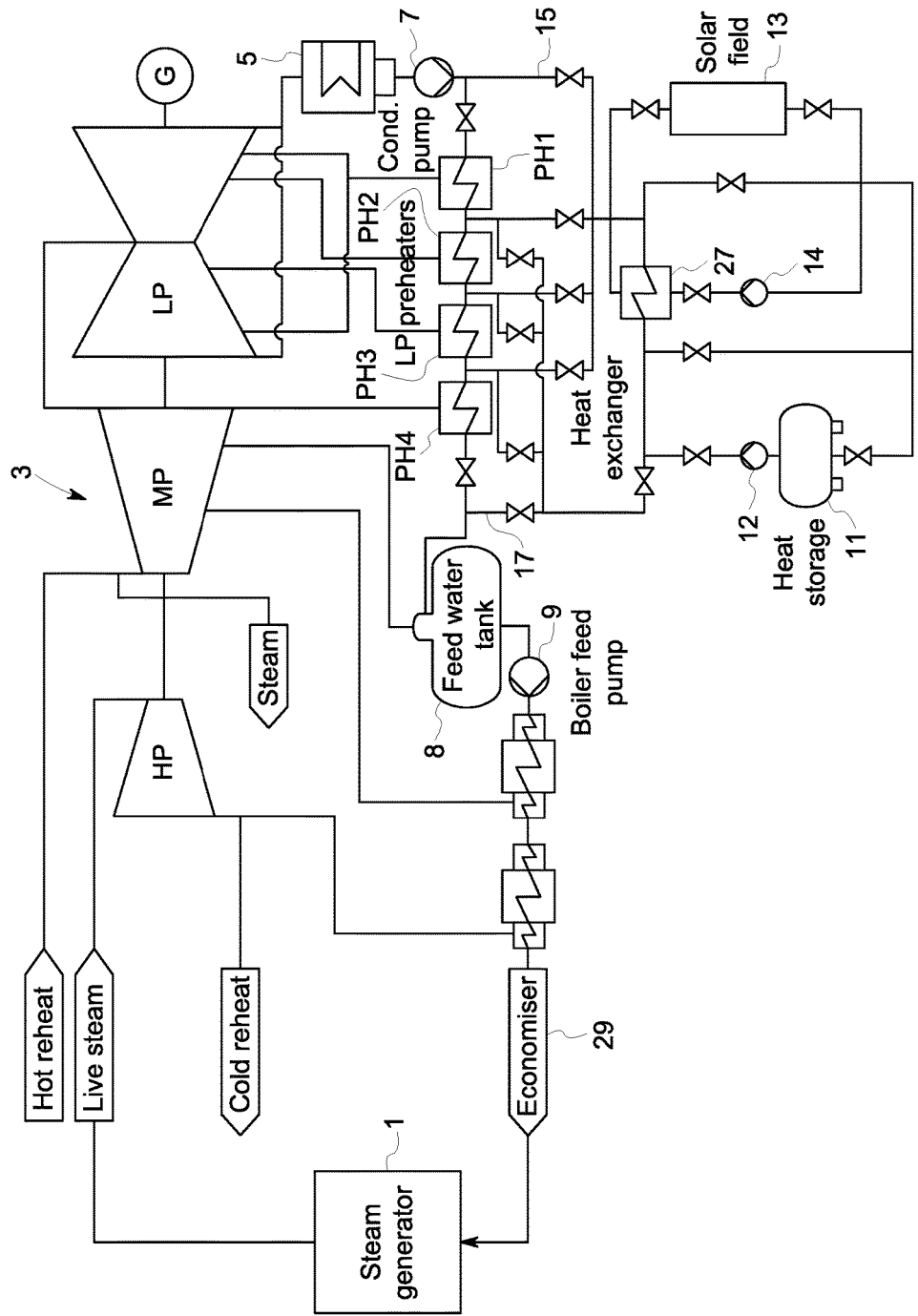
FIG. 4 is a fourth embodiment of the claimed invention (LP indirect integration and solar field closed loop)

The second to fourth embodiment (options b).1 to b).3, c. f. FIGS. 2 to 4) comprises a heat exchanger 23 between the condensate line 19 and the solar field 13 and/or the heat stored in the heat storage 11.

This heat exchanger 23 transfers the thermal energy from the solar system 13 and the heat storage 8 to the condensate line 19 or more generally spoken to the water steam system of the power plant.

This separation is necessary when the medium used in the solar system 13 and the heat storage 11 is not water, does not have the same state of aggregation (e.g vapor instead of fluid), the same state of quality or when a separation is advantageous for security reasons.

The system illustrated in FIG. 2 uses the same heat carrier for the heat storage 11 and the solar field 13 and comprises the same structure between the heat storage tanks 11 and the solar field 13 as the first embodiment (FIG. 1). This is called in conjunction with the claimed invention a direct storage integration.

The system illustrated in FIG. 3 comprises a further heat exchanger 25. Consequently the heat carrier for the heat storage 11 and the solar field 13 may be different. This is called in conjunction with the claimed invention an indirect storage integration. A pump 14 is installed to transport the heat carrier from the solar field 13 and to the bypass outlet 17 through the heat exchanger 25.

Depending on the medium and on the state of aggregation (vapor or fluid) of the heat carrying medium it is in some cases technically and economically more advantageous to have a separation between the solar field 13 and the heat storage 11 (FIG. 3). In this case an additional heat exchanger 25 between this both components transfers the energy from the solar field to the heat storage.

This system can be used in both ways: either the heat collected in the solar field 13 is transmitted to the heat storage 8, because the collected solar energy cannot be used in the existing water steam cycle at the time of collection, because there is not enough demand.

Alternatively the heat in the storage tanks 11 is transmitted to the fluid coming from the solar field 13, because there is not enough solar energy collected to cover the present energy demand in the water steam cycle.

The option b).3 displayed in FIG. 4 is the combination between a heat storage system 11 that is directly connected to the condensate line 19 and a closed solar system 13. To transfer the energy collected by the closed solar system or field 13 to either the condensate line 19 or the heat storage 11 a heat exchanger 27 and a pump 14 are provided.

The collected energy from the solar field 13 is transmitted to the additional heat exchanger 27. This thermal energy can then be transferred either directly to the condensate line 19 (i. e. back to the existing water steam system) or to the heat storage 11. This option allows the use of the energy stored in the heat storage 11 without launching the solar system 13 (e.g. at night).

Figure 5:
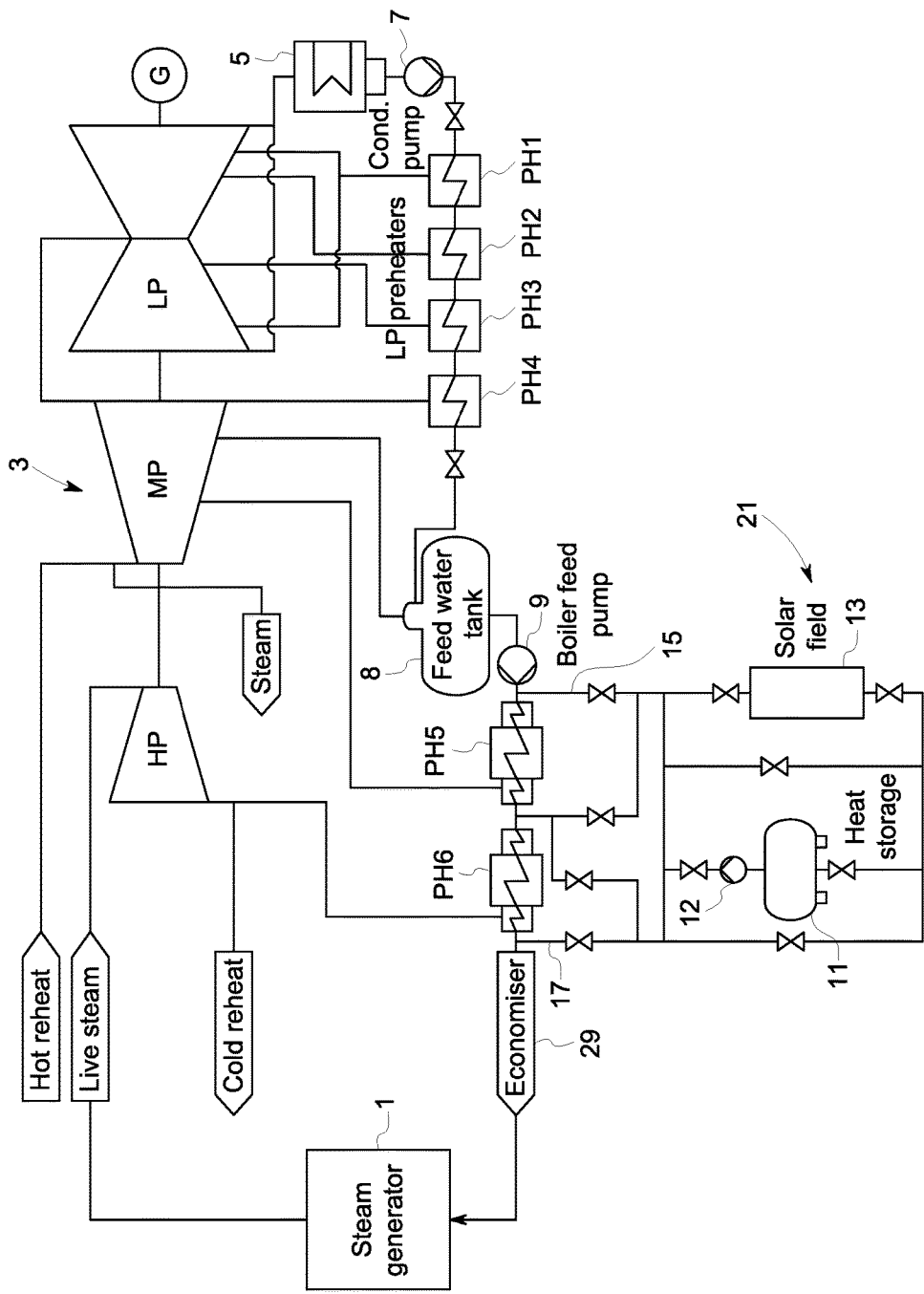
FIG. 5 is a fifth embodiment of the claimed invention (HP direct integration)

FIG. 5 Option c) High Pressure Direct Integration

The fifth embodiment illustrated in FIG. 5 comprises the same solar system structure and the same integration idea than in option a) (c. f. FIG. 19. The main differences are the points where the energy from the solar field 13 and/or the heat storage 11 is fed into the water steam cycle.

The energy from the solar field 13 and/or the heat storage 11 is fed into the condensate 19 at the high pressure preheating train downstream the feed water container 8 and upstream an economiser 29 as displayed in FIG. 5: the bypass inlet 15 location is downstream the boiler feed pump 9 and the bypass outlet 17 is downstream the last high pressure preheater PH6. The bypass inlet 15 and outlet 17 can be adapted to the optimal operation temperature of the solar field 13 by changing the integration location within the high pressure preheating train.

A single HP-preheater PH5 or more than one HP-preheater PH5, PH6 can be bypassed depending on the temperature level wanted.

The solar system, comprising of the solar field 13 and the heat storage 11 for solar energy replaces then the existing pre-heating train (PH5, PH6) partially or completely and consequently the energy of the extracted steam from the high pressure part 3.1 of the turbine 3.

Figure 6:
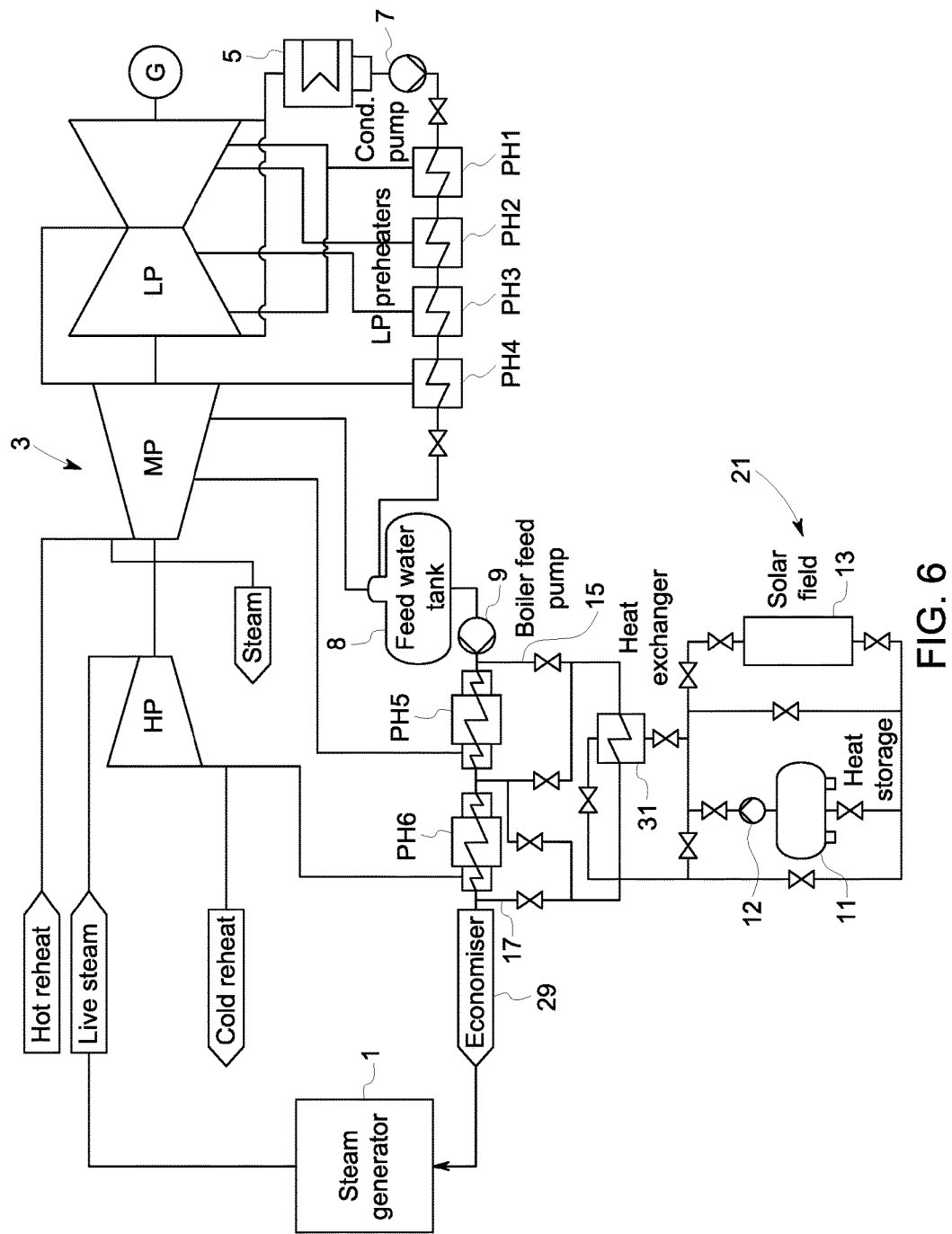
FIG. 6 is a sixth embodiment of the claimed invention (HP indirect integration with direct heat storage integration)

FIG. 6 Option d) High Pressure Indirect Integration

Figure 7:
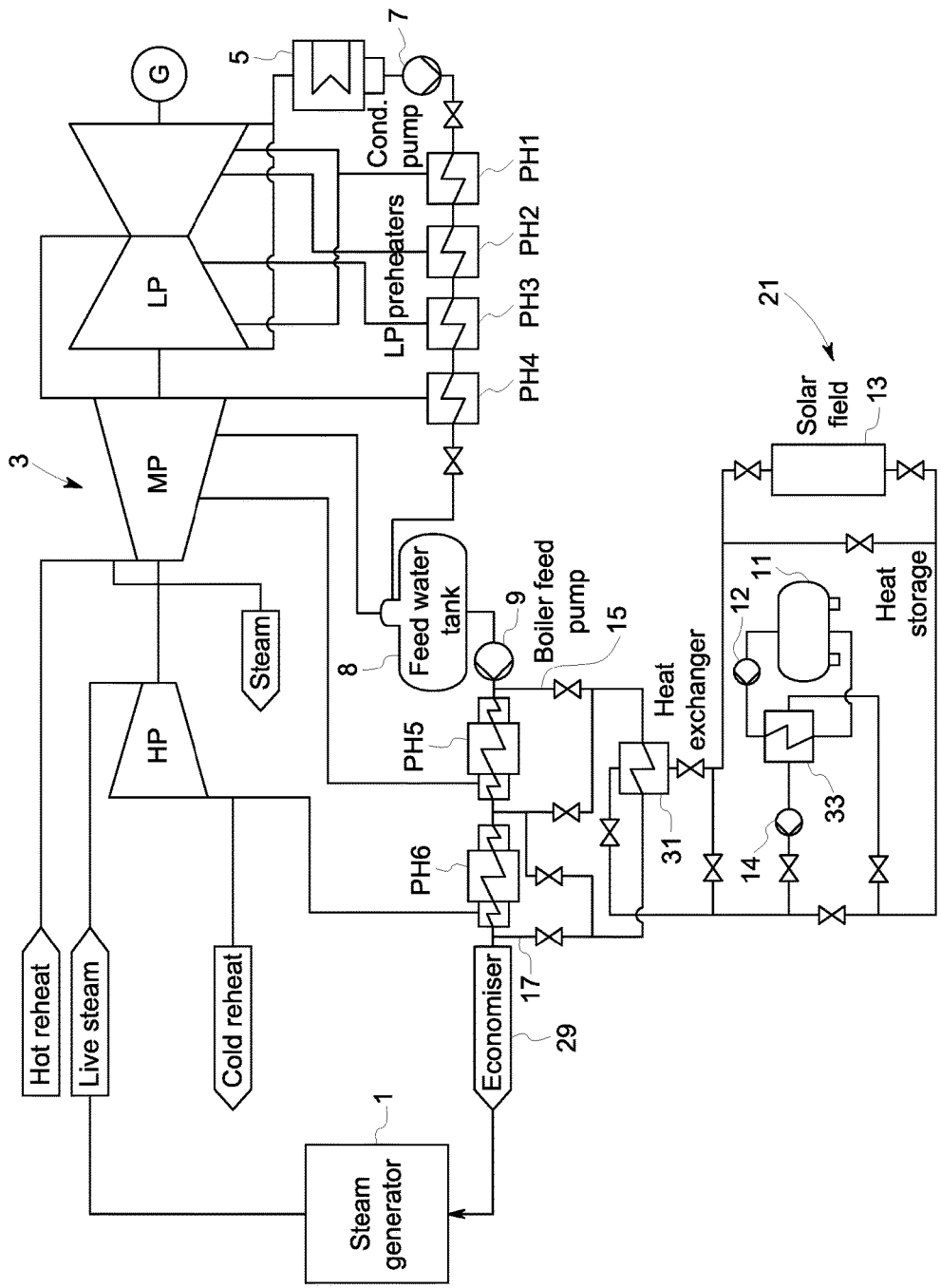
FIG. 7 is a seventh embodiment of the claimed invention (HP indirect integration with indirect heat storage integration)
Figure 8:
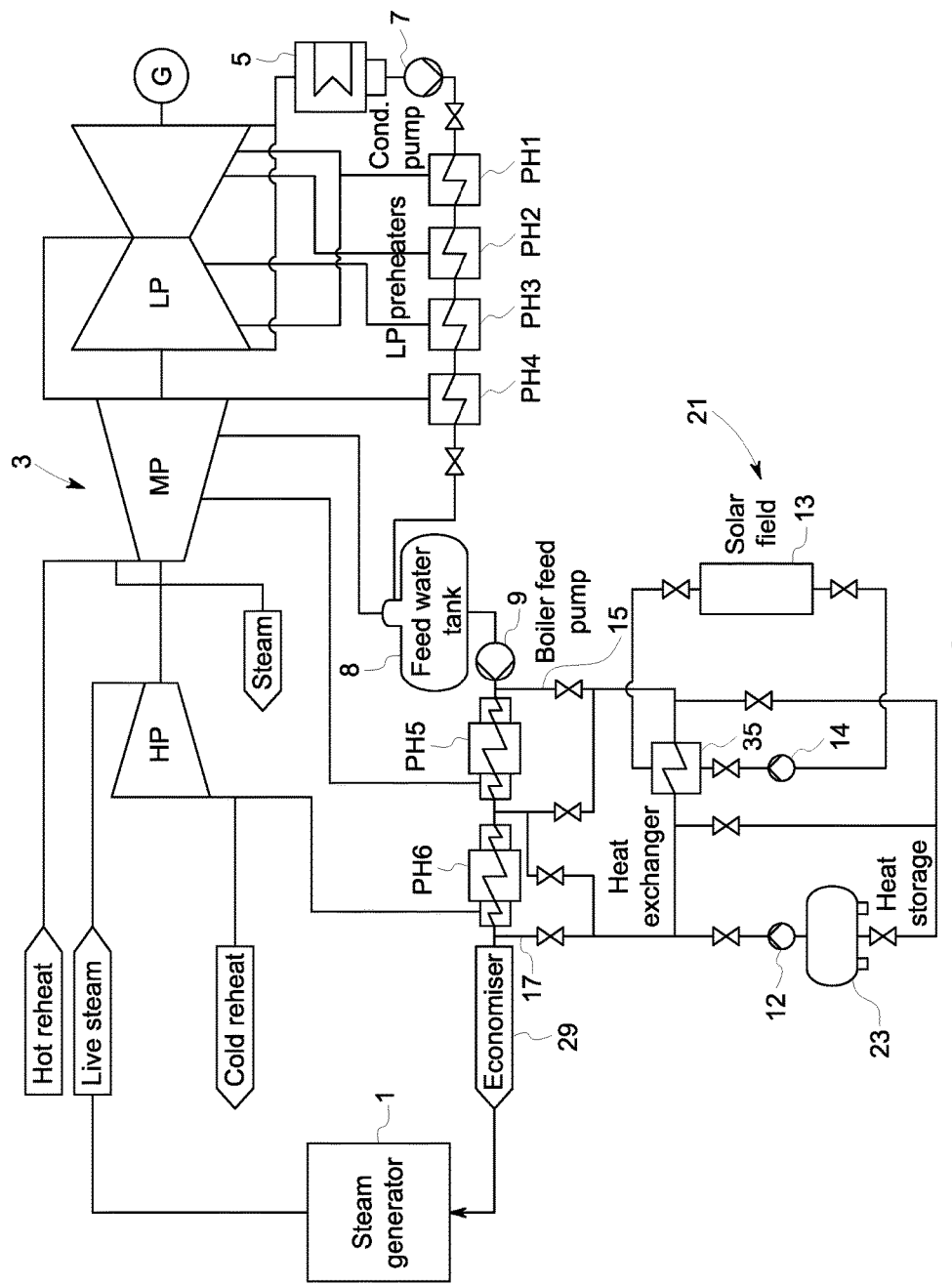
FIG. 8 is an eighth embodiment of the claimed invention (HP indirect integration and solar field closed loop)

The sixth to eights embodiments are illustrated in FIGS. 6 to 8 and comprise the same integration location than the fifth embodiment and the same integration concept than in option b) (c. f. FIGS. 2 to 4). They are displayed
 in FIG. 6 for option d).1,
 in FIG. 7 for option d).2 and in
 in FIG. 8 for option d).3.

The difference is that the solar energy is indirectly integrated or fed into the steam water circuit. An additional heat exchanger 31 transfers the thermal energy from the solar system, comprising of the solar field 13 and the heat storage 11, to the feed water system of the steam power plant. This separation is necessary when the medium used in the solar system is not water, does not have the same state (e.g. vapor instead of fluid), same quality or when a separation is advantageous for security reasons.

The differentiation between option d).1 and d).2 (c. f. FIG. 7) is the direct or the indirect integration of the heat storage 11 in the solar system. Depending on the medium and on the medium state of aggregation (vapor or fluid) it is in some cases technically and economically more advantageous to have a separation between the solar field and the heat storage (option d).2).

In this case an additional heat exchanger 33 between the heat storage 11 and the solar field 13 transfers the energy from the solar field 13 to the heat storage 11 is installed. This system can be used in both ways: either the heat in the solar field 13 is transmitted to the heat storage 11, because the collected solar energy cannot be integrated in the existing water steam cycle, due to a lack of demand.

Alternatively the heat stored in the storage tanks 11 is transmitted to the fluid coming from the solar field 13, to raise its temperature, because there is not enough solar energy available to satisfy the energy demand of the water steam cycle.

The option d).1 comprises the same structure between the heat storage tanks and the solar field than in option c).

The option d).3 displayed in FIG. 8 is combination of a heat storage system 11 directly connected to the feed water preheating system PH5, PH6 or the condensate line 19 and a closed solar system (indirect integration). The energy from the solar field 13 is transmitted to an additional heat exchanger 35. This energy can then be transferred either directly to the feed water preheating system (back to the existing system) or to the storage tank 11. It is still possible to use the energy stored in the heat storage 11 without launching the solar system 13 (e.g. at night).

Figure 9:
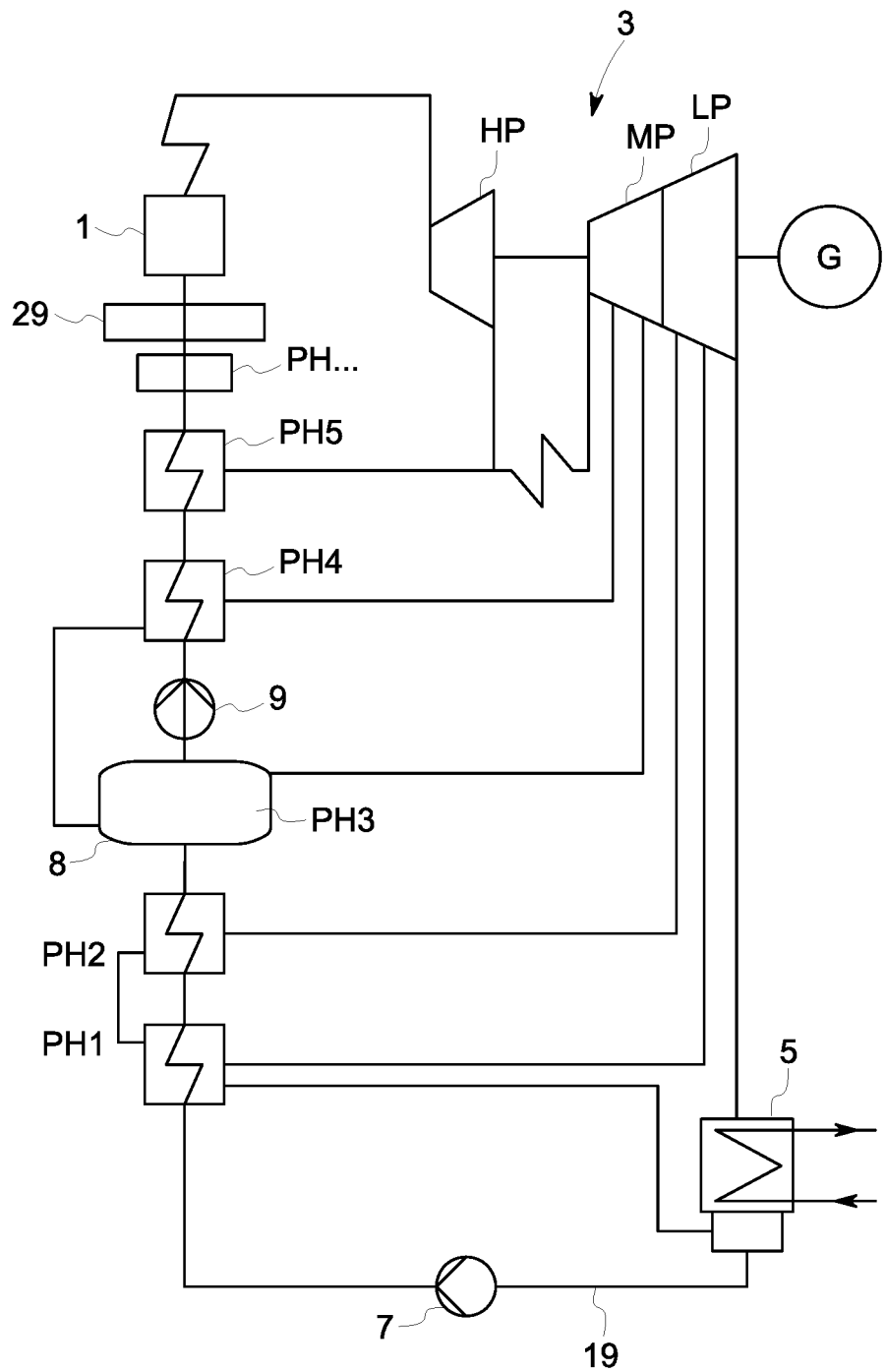
FIG. 9 is a block diagram of a conventional steam power plant (prior art).

In FIG. 9 a conventional steam power plant fuelled with fossils or biomass is represented as block diagram. FIG. 1 essentially has the purpose of designating the components of the power plant and to represent the water-steam-cycle in its entirety. For reasons of clarity in the following figures only those parts of the water-steam-cycle are represented which are essential to the invention.

In a steam generator 1 under utilization of fossil fuels or biomass live steam is generated out of the feed water. The live steam is expanded in a steam turbine 3 and thus drives a generator G. Turbine 3 can be separated into a high-pressure part HP, a medium-pressure part MP and a low-pressure part LP.

After expanding the steam in turbine 3, it streams into a condenser 5 and is liquefied there. For this purpose a generally liquid cooling medium, as e. g. cooling water, is supplied to condenser 5. This cooling water is then cooled in a cooling tower (not shown) or by a river in the vicinity of the power plant (not shown), before it enters into condenser 5.

The condensate originated in condenser 5 is then supplied, by a condensate pump 7, to several preheaters PHi, with i=1 . . . n. In the shown embodiment downstream second preheater PH2 a feed water container 8 is arranged. The feed water container 8 may comprise a third preheater PH3. Behind the feed water container 8 a feed water pump 9 is provided.

In combination with the invention it is of significance that the condensate from condenser 5 is preheated with steam beginning with the first preheater PH1 until the last preheater PH5. The tapping steam is taken from turbine 3 and leads to a diminution of the output of turbine 3. With the heat exchange between tapping steam and condensate the temperature of the condensate increases from preheater to preheater. Consequently the temperature as well of the steam utilized for preheating must increase from preheater to preheater.

In FIG. 9 the preheaters PH1 and PH2 are heated with steam from low-pressure part LP of steam turbine 3, whereas the last preheater PH5 is partially heated with steam from the high-pressure part HP of steam turbine 3. The third preheater PH3 arranged in the feed water container 8 is heated with steam from the medium-pressure part MP of turbine 3.

The invention claimed is:

1. A steam power plant comprising:
a steam generator to produce steam,
a turbine in fluid communication with the steam generator to receive the steam,
a condenser in fluid communication with the turbine to receive and cool the steam exiting the turbine to provide feedwater,
a feedwater container,
at least one low-pressure preheater,
at least one high-pressure preheater,
a condensate line to provide the feedwater from the condenser to the steam generator fluidly connecting the at least one low-pressure preheater, the feedwater container and the at least one high-pressure preheater, and
a solar system in parallel fluid communication with the condensate line to selectively heat the feedwater, the solar system including:
a bypass line in parallel fluid communication with the condensate line, wherein the bypass line includes a bypass inlet and a bypass outlet in fluid communication with the condensate line;
a field of solar collectors in thermal communication with the bypass line to provide heat to increase the temperature of the feedwater provided to the steam generator; and
a heat storage in thermal communication with the bypass line to provide heat to increase the temperature of the feedwater passing through the bypass line, which is provided to the steam generator, and to store heat generated by the field of solar collectors, wherein the heat storage is connected in parallel and in fluid communication with the field of solar collectors, and wherein the heat storage is in communication with a pump configured to load and unload the heat storage.

2. The steam power plant according to claim 1, wherein the bypass line is in parallel fluid communication with the at least one low-pressure preheater.

3. The steam power plant according to claim 2, wherein the field of solar collectors is in fluid communication with the bypass inlet and the bypass outlet to heat the feedwater.

4. The steam power plant according to claim 3, wherein the heat storage is in parallel fluid communication with the field of solar collectors and in fluid communication with the bypass inlet and the bypass outlet to heat the feedwater.

5. The steam power plant according to claim 1, wherein the at least one low-pressure preheater includes a plurality of low-pressure preheaters in serial fluid communication with the condensate line, and
wherein the bypass line is in parallel fluid communication with at least two of the plurality of low-pressure preheaters.

6. The steam power plant according to claim 1, wherein the bypass line is in parallel fluid communication with the at least one high-pressure preheater.

7. The steam power plant according to claim 6, wherein the field of solar collectors is in fluid communication with the bypass inlet and the bypass outlet to heat the feedwater.

8. The steam power plant according to claim 7, wherein the heat storage is in parallel fluid communication with the field of solar collectors and in fluid communication with the bypass inlet and the bypass outlet to heat the feedwater.

9. The steam power plant according to claim 1, wherein the at least one high-pressure preheater includes a plurality of high-pressure preheaters in serial fluid communication with the condensate line, and
wherein the bypass line is in parallel fluid communication with at least two of the plurality of high-pressure preheaters.

10. The steam power plant according to claim 1, wherein the field of solar collectors is in thermal and fluid communication with the bypass line.

11. A method of operating a steam power plant, the method comprising:
producing steam in a steam generator,
providing the steam from the steam generator to a turbine,
condensing the steam exiting the turbine to provide feedwater, providing the feedwater to a feedwater container, at least one low-pressure preheater, and at least one high-pressure preheater fluidly connecting a condensate line,
selectively heating the feedwater by a solar system in parallel fluid communication with the condensate line,
providing a bypass line in parallel fluid communication with the condensate line, wherein the bypass line includes a bypass inlet and a bypass outlet in fluid communication with the condensate line,
heating the feedwater flowing through the bypass line via a field of solar collectors, wherein the field of solar collectors is in thermal communication with the bypass line,
heating the feedwater flowing through the bypass line via a heat storage, and
storing heat generated by the field of solar collectors in the heat storage, wherein the heat storage is connected in parallel and in fluid communication with the field of solar collectors, and wherein the heat storage is in communication with a pump configured to load and unload the heat storage.

12. The method according to claim 11, wherein the bypass line is in parallel fluid communication with the at least one low-pressure preheater.

13. The method according to claim 12, wherein the field of solar collectors is in fluid communication with the bypass inlet and the bypass outlet to heat the feedwater.

14. The method according to claim 13, wherein the heat storage is in parallel fluid communication with the field of solar collectors and in fluid communication with the bypass inlet and the bypass outlet to heat the feedwater.

15. The method according to claim 11, wherein the at least one low-pressure preheater includes a plurality of low-pressure preheaters in serial fluid communication with the condensate line, and
wherein the bypass line is in parallel fluid communication with at least two of the plurality of low-pressure preheaters.

16. The method according to claim 11, wherein the bypass line is in parallel fluid communication with the at least one high-pressure preheater.

17. The method according to claim 16, wherein the field of solar collectors is in fluid communication with the bypass inlet and the bypass outlet to heat the feedwater.

18. The method according to claim 17, wherein the heat storage is in parallel fluid communication with the field of solar collectors and in fluid communication with the bypass inlet and the bypass outlet to heat the feedwater.

19. The method according to claim 11, wherein the at least one high-pressure preheater includes a plurality of high-pressure preheaters in serial fluid communication with the condensate line, and
wherein the bypass line is in parallel fluid communication with at least two of the plurality of high-pressure preheaters.

* * * * *